United States Patent
Goldstein et al.

(10) Patent No.: US 10,324,986 B2
(45) Date of Patent: Jun. 18, 2019

(54) SEARCH DECONSTRUCTION, RECONSTRUCTION, AND ALLOCATION

(71) Applicant: Hipmunk, Inc., San Francisco, CA (US)

(72) Inventors: Adam Julian Goldstein, San Francisco, CA (US); Navin Lal, San Francisco, CA (US); Zak Lee, San Francisco, CA (US); Richard Shaffer, San Francisco, CA (US); Zohaib Ahmed, San Francisco, CA (US)

(73) Assignee: Hipmunk, Inc., South San Francisco, CA (US)

( * ) Notice: Subject to any disclaimer, the term of this patent is extended or adjusted under 35 U.S.C. 154(b) by 78 days.

(21) Appl. No.: 15/598,848

(22) Filed: May 18, 2017

(65) Prior Publication Data

US 2017/0344640 A1    Nov. 30, 2017

Related U.S. Application Data

(60) Provisional application No. 62/342,503, filed on May 27, 2016.

(51) Int. Cl.
*G06F 16/00* (2019.01)
*G06F 16/951* (2019.01)
(Continued)

(52) U.S. Cl.
CPC .......... *G06F 16/951* (2019.01); *G06F 16/338* (2019.01); *G06F 16/3334* (2019.01);
(Continued)

(58) Field of Classification Search
CPC ................................................ G06F 17/30864
See application file for complete search history.

(56) References Cited

U.S. PATENT DOCUMENTS 6,505,151 B1    1/2003   Chou et al.
2007/0174269 A1 7/2007   Jing et al.
(Continued)

FOREIGN PATENT DOCUMENTS

WO    2017205405    11/2017

OTHER PUBLICATIONS

"International Application Serial No. PCT US2017 034045, International Preliminary Report on Patentability dated Aug. 9, 2018", 10 pgs.

(Continued)

*Primary Examiner* — Grace Park
(74) *Attorney, Agent, or Firm* — Schwegman Lundberg & Woessner, P.A.

(57) ABSTRACT

A machine is configured to access a search phrase or other communicated phrase and deconstruct the accessed phrase into multiple sub-phrases. The machine performs an analysis of n-grams that occur within the sub-phrases, generates a set of potentially different sub-phrases from the n-grams, and selects which data source among multiple available video sources should be accessed for each generated sub-phrase in the generated set. For example, the machine may allocate each generated sub-phrase to a corresponding data source and cause the corresponding data source to execute a query based on its corresponding sub-phrase. Thus, the machine chooses from which data source to obtain partial search results that correspond to each sub-phrase generated based on the analyzed n-grams in the accessed phrase.

19 Claims, 6 Drawing Sheets

(51) Int. Cl.
G06F 16/35 (2019.01)
G06F 16/338 (2019.01)
G06F 16/33 (2019.01)
*G06Q 10/02* (2012.01)
*G06F 16/93* (2019.01)

(52) U.S. Cl.
CPC .......... G06F 16/3344 (2019.01); G06F 16/35 (2019.01); *G06F 16/93* (2019.01); *G06Q 10/02* (2013.01)

(56) References Cited

U.S. PATENT DOCUMENTS

2011/0258212 A1   10/2011   Lu et al.
2012/0197937 A1    8/2012   Kakarla et al.
2013/0036137 A1    2/2013   Ollis et al.
2016/0092434 A1    3/2016   Bellegarda

OTHER PUBLICATIONS

"International Application Serial No. PCT/US2017/034045, International Search Report dated Aug. 7, 2017", 2 pgs.
"International Application Serial No. PCT/US2017/034045, Written Opinion dated Aug. 7, 2017", 7 pgs.

US 10,324,986 B2

SEARCH DECONSTRUCTION, RECONSTRUCTION, AND ALLOCATION

RELATED APPLICATION

This application claims the priority benefit of U.S. Provisional Patent Application No. 62/342,503, filed May 27, 2016, which is incorporated herein by reference in its entirety.

TECHNICAL FIELD

The subject matter disclosed herein generally relates to the technical field of special-purpose machines that implement search engines or facilitate interactions with search engines, including software-configured computerized variants of such special-purpose machines and improvements to such variants, and to the technologies by which such special-purpose machines become improved compared to other special-purpose machines that implement search engines or facilitate interactions with search engines. Specifically, the present disclosure addresses systems and methods to facilitate modification of a search (e.g., by performing search deconstruction, reconstruction, and allocation).

BACKGROUND

A machine may be configured to interact with one or more users by receiving one or more searches (e.g., queries or other commands or requests to perform a search based on one or more submitted search criteria) and providing corresponding search results. For example, a machine in the example form of a search engine (e.g., a server machine configured to provide database searching services over a network to one or more users via client devices) may be configured to accept a submission of one or more search criteria from a user's device, use the submitted one or more search criteria to retrieve corresponding search results, and provide the search results to the user's device.

BRIEF DESCRIPTION OF THE DRAWINGS

Some embodiments are illustrated by way of example and not limitation in the figures of the accompanying drawings.

DETAILED DESCRIPTION

Figure 1:
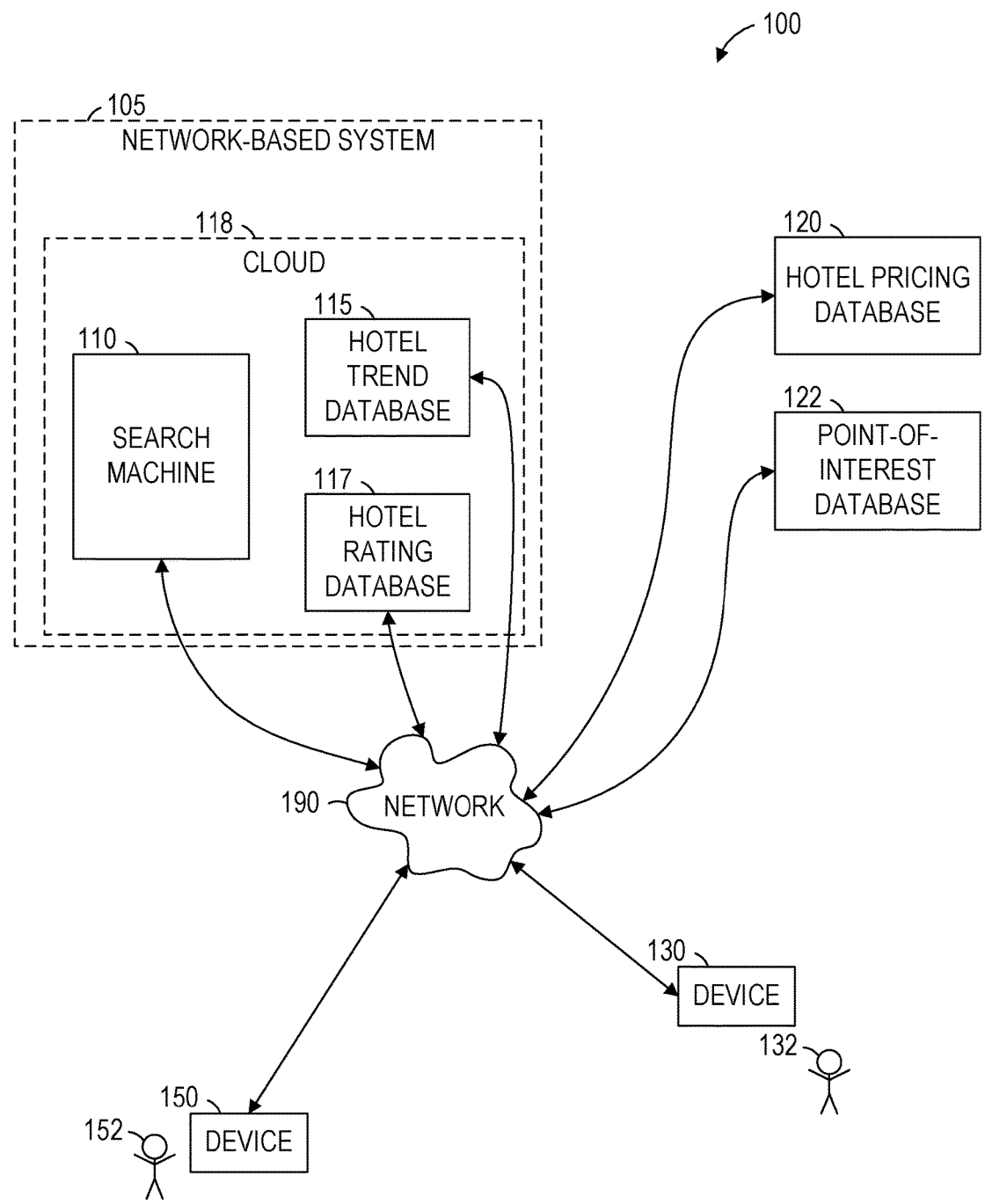
FIG. 1 is a network diagram illustrating a network environment suitable for search deconstruction, reconstruction, and allocation, according to some example embodiments.

Example methods (e.g., algorithms) facilitate modification of a search (e.g., modifying a submitted query and then processing the modified query), and example systems (e.g., special-purpose machines configured by special-purpose software) are configured to facilitate modification of a search. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

In accordance with the example methods discussed herein, example systems are configured to perform search deconstruction, search reconstruction, and search allocation to transform a natural language query into a set of separate searches that are then separately directed to different data sources among multiple data sources. Deconstruction of a search, reconstruction of searches, allocation of searches, or any suitable combination thereof, may be performed by such example systems or via such example methods using noun-phrase recognition and n-gram analysis. A machine (e.g., a search engine or other suitable server machine) is configured (e.g., by hardware modules, software modules, or both) to perform one or more example embodiments of the methodologies discussed herein, by which the machine is caused to deconstruct a search phrase or other communicated phrase into multiple sub-phrases (e.g., noun-phrases or other clauses) and perform an analysis of n-grams (e.g., an n-gram comparison) within the sub-phrases.

In an example scenario, a user communicates (e.g., submits) the phrase, "I want a popular 3-star hotel under $200 that's close to a coffee shop" (e.g., by submitting typed text or speaking a voice command into a search interface or into a machine-monitored message conversation). The machine (e.g., a smartphone or other suitable user device) deconstructs (e.g., breaks up or otherwise parses) the communicated phrase into n-grams, reconstructs (e.g., builds using semantic analysis of the n-grams) a set of potentially different sub-phrases (e.g., noun-phrases or other clauses) from the n-grams, and determines (e.g., automatically selects) which data source (e.g., which search engine or other database) among multiple available data sources is to be accessed for each reconstructed sub-phrase.

Thus configured, the machine chooses from which data source to obtain corresponding search results for each sub-phrase. In this sense, each sub-phrase may be considered as a partial query, a secondary query, or a sub-query, in relation to the user's originally submitted phrase, which may be considered as a full query or a primary query. By selecting which data sources to search and then invoking searches using the allocated sub-phrases, the machine acts as a manager (e.g., controller) for the data sources. In situations where the machine (e.g., a server machine) is separate or otherwise distinct from the user's device (e.g., a smartphone or tablet computer), by aggregating search results from the selected data sources and causing the user's device to present at least some of these aggregated search results, the machine acts as a manager (e.g., controller) for the user's device.

As examples of sub-phrases in the above example scenario, the sub-phrase "popular hotel" may be constructed by the machine and allocated to a hotel trend database (e.g., queried against historical data stored in the hotel trend database, which may be maintained and operated by a hotel booking provider or other travel service provider). The sub-phrase "3-star hotel" may be constructed (e.g., reconstructed, in this case) by the machine and allocated to a hotel rating database (e.g., queried against rating data stored in the hotel rating database, which may be maintained and operated by a same or different hotel booking provider or other travel service provider). The sub-phrase (e.g., noun-phrase) "$200 hotel" may be constructed by the machine and allocated to a hotel pricing database (e.g., queried against pricing data stored in the hotel pricing database and accessible via a corresponding application programming interface (API)). The sub-phrase "hotel close to a coffee shop" may be reconstructed by the machine and allocated to a point-of-interest (POI) database (e.g., queried against POI data stored in the POI database and accessible via a corresponding API). Thus, for each reconstructed sub-phrase, the machine allocates or otherwise assigns (e.g., maps or links) that sub-phrase to a selected data source and obtains search results (e.g., as partial search results) from that selected data source. The machine then compiles the obtained search results, arranges (e.g., selects, ranks, or sorts) the search results, and causes the search results to be presented (e.g., via a client device) to the user.

In some example embodiments, the search results are selected, arranged, or both, according to various weights (e.g., weighting scalars, weighting coefficients, or other weighting values) assigned to the reconstructed sub-phrases. Each sub-phrase may be assigned a corresponding (e.g., different) weight by the machine. For example, the machine may be configured to perform sentiment analysis, thus enabling the machine to select or arrange the search results according to machine-inferred sentiments and degrees of intensity (e.g., sentiment strength) thereof. Based on the sentiment analysis, the machine assigns different weights to different sub-phrases, and each of the different weights is applied in selecting, ranking, sorting, highlighting, or otherwise presenting those search results that were obtained from the data source that corresponds to the sub-phrase. For example, the sentiment analysis may indicate a level of specificity for a given n-gram or for a given sub-phrase. The machine may select a general database (e.g., a general-purpose search engine) for n-grams or sub-phrases of low specificity (e.g., below a threshold value) or select a specialized database (e.g., from among multiple specialized databases) for n-grams or sub-phrases of high specificity (e.g., at or above a threshold value).

Solely for purposes of illustrative clarity, the example embodiments described herein are described in the example context of facilitating a search for hotels or other accommodations. However, the systems and methods discussed herein are applicable to other types of searches (e.g., airline flights, car rentals, event tickets, and other goods or services). For example, a search phrase may be "I'm looking for a flight that has lay-flat business-class seats from San Francisco to London from under $3000 round-trip, and it's important that the flight isn't delayed often." As another example, a search phrase may be "am looking for an SUV rental that costs less than $50 a day, ideally from downtown SF, but if necessary, from SFO." Accordingly, the example scenarios and example embodiments discussed herein are to be understood in an illustrative sense, not a restrictive sense.

FIG. 1 is a network diagram illustrating a network environment 100 suitable for search deconstruction, reconstruction, and allocation, according to some example embodiments. The network environment 100 includes a search machine 110 (e.g., a search server machine or a search modification machine), a hotel trend database 115, a hotel rating database 117, a hotel pricing database 120, a POI database 122, and devices 130 and 150 (e.g., client devices), all communicatively coupled to each other via a network 190. The search machine 110, with or without any one or more of the hotel trend database 115, the hotel rating database 117, the hotel pricing database 120, and the POI database 122, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The search machine 110 and the devices 130 and 150 may each be implemented in a special-purpose (e.g., specialized) computer system, in whole or in part, as described below with respect to FIG. 6.

One or more of the hotel trend database 115, the hotel rating database 117, the hotel pricing database 120, and the POI database 122 may be maintained and operated by an entity that maintains and operates the search machine 110. In various example embodiments, however, one or more of the hotel trend database 115, the hotel rating database 117, the hotel pricing database 120, and the POI database 122 is maintained and operated by a third-party entity distinct from the entity that maintains and operates the search machine 110.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
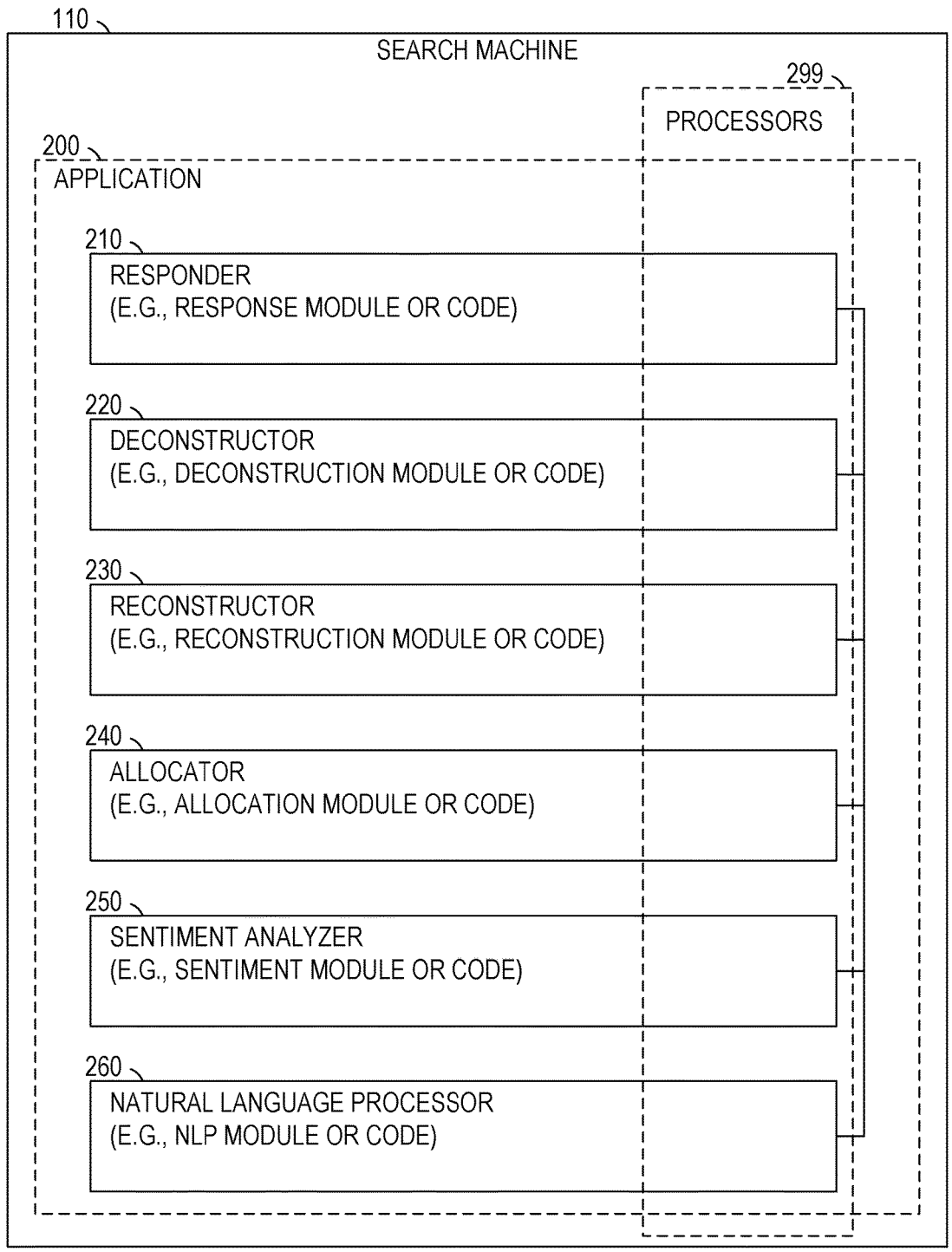
FIG. 2 is a block diagram illustrating components of a search machine suitable for search deconstruction, reconstruction, and allocation, according to some example embodiments.

FIG. 2 is a block diagram illustrating components of the search machine 110, according to some example embodiments. The search machine 110 is shown as including a responder 210 (e.g., a response module or suitable response handling code), a deconstructor 220 (e.g., a deconstruction module or suitable query phrase deconstruction code), a reconstructor 230 (e.g., a reconstruction module or suitable query phrase reconstruction code), an allocator 240 (e.g., an allocation module or suitable sub-phrase allocation code), a sentiment analyzer 250 (e.g., a sentiment module or suitable sentiment analysis code), and a natural language processor 260 (e.g., a natural language processing (NLP) module or suitable NLP code), all configured to communicate with each other (e.g., via a bus, shared memory, or a switch).

The natural language processor 260 is configured in accordance with one or more NLP algorithms (e.g., configured to execute the one or more NLP algorithms). According to various example embodiments, the responder 210, the deconstructor 220, the reconstructor 230, the allocator 240, the sentiment analyzer 250, or any suitable combination thereof, is configured to invoke (e.g., execute, request, command, or otherwise initiate) one or more of the NLP algorithms supported by the natural language processor 260. In some example embodiments, the natural language processor 260 provides an API or other programmatic interface to interact with (e.g., provide NLP services to) the responder 210, the deconstructor 220, the reconstructor 230, the allocator 240, the sentiment analyzer 250, or any suitable combination thereof.

As shown in FIG. 2, the responder 210, the deconstructor 220, the reconstructor 230, the allocator 240, the sentiment analyzer 250, and the natural language processor 260 may form all or part of an application 200 (e.g., a server-side application) that is stored (e.g., installed) on the search machine 110. Furthermore, one or more processors 299 (e.g., server-side hardware processors, digital processors, or any suitable combination thereof) may be included (e.g., temporarily or permanently) in the application 200, the responder 210, the deconstructor 220, the reconstructor 230, the allocator 240, the sentiment analyzer 250, the natural language processor 260, or any suitable combination thereof.

Figure 3:
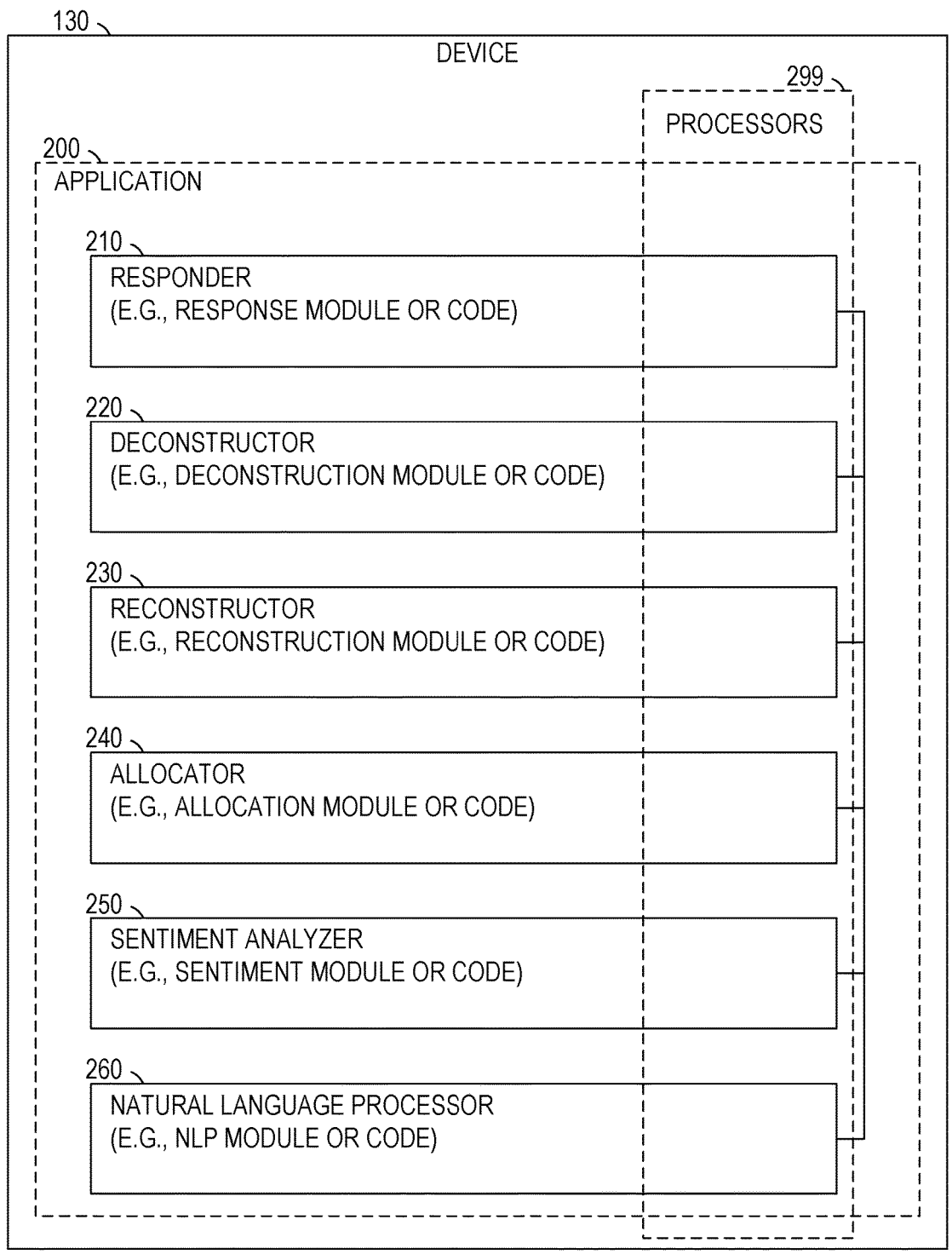
FIG. 3 is a block diagram illustrating components of a device suitable for search deconstruction, reconstruction, and allocation, according to some example embodiments.

FIG. 3 is a block diagram illustrating components of the device 130, which can be configured for search deconstruction, reconstruction, and allocation, according to some example embodiments. The device 130 is shown as including the responder 210, the deconstructor 220, the reconstructor 230, the allocator 240, the sentiment analyzer 250, and the natural language processor 260, all configured to communicate with each other (e.g., via a bus, shared memory, or a switch).

As shown in FIG. 3, the application 200 (e.g., a mobile app, an applet, or a client-side application) may be stored (e.g., installed) on the client device 130 (e.g., in a manner similar to that described above with respect to the search machine 110). As noted above, the responder 210, the deconstructor 220, the reconstructor 230, the allocator 240, the sentiment analyzer 250, and the natural language processor 260 may form all or part of the application 200. In addition, one or more processors 299 (e.g., client-side hardware processors, digital processors, or any suitable combination thereof) may be included (e.g., temporarily or permanently) in the application 200, the responder 210, the deconstructor 220, the reconstructor 230, the allocator 240, the sentiment analyzer 250, the natural language processor 260, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
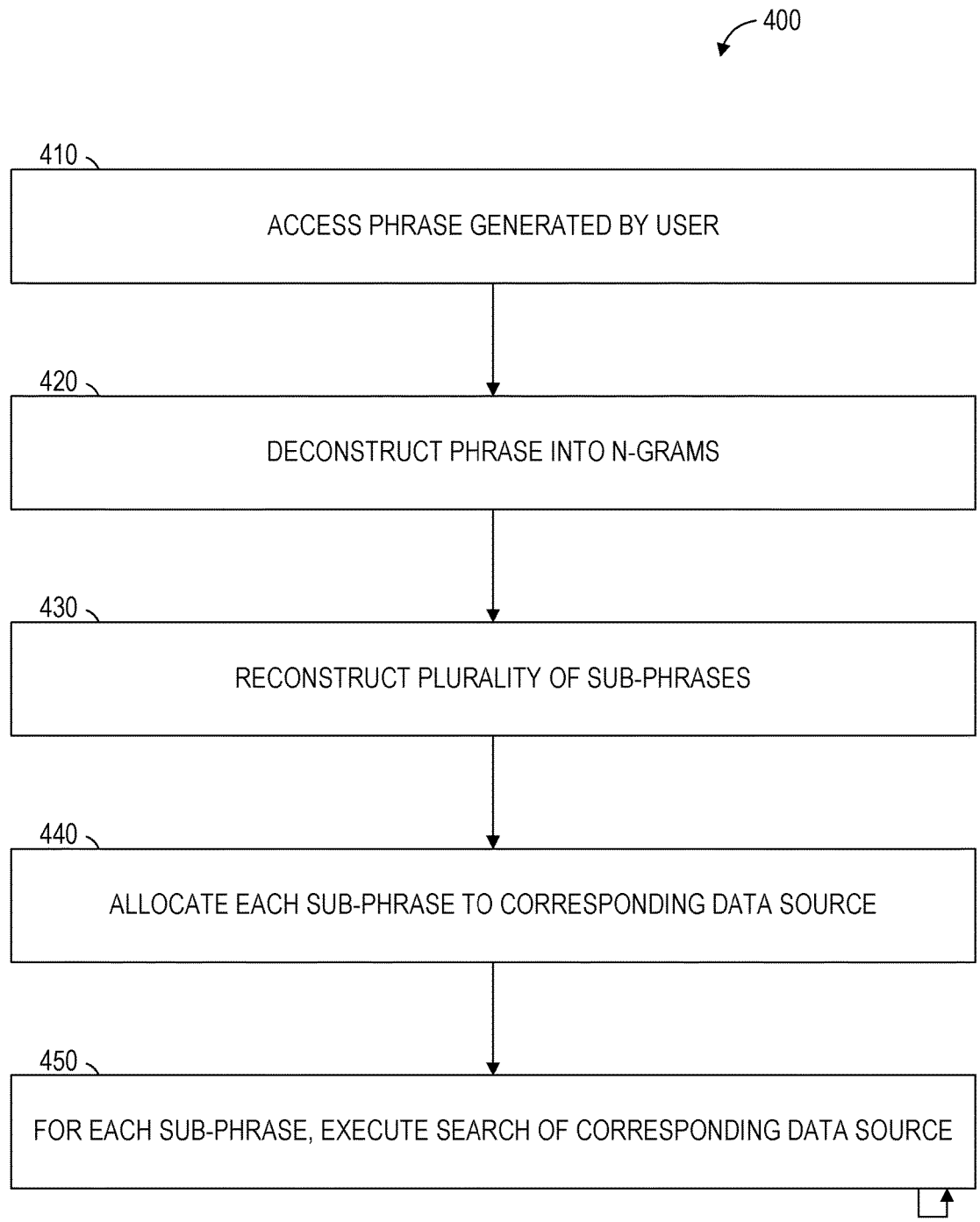
FIGS. 4 and 5 are flowcharts illustrating operations (e.g., of the search machine or of the device) in performing a method of search deconstruction, reconstruction, and allocation, according to some example embodiments.
Figure 5:
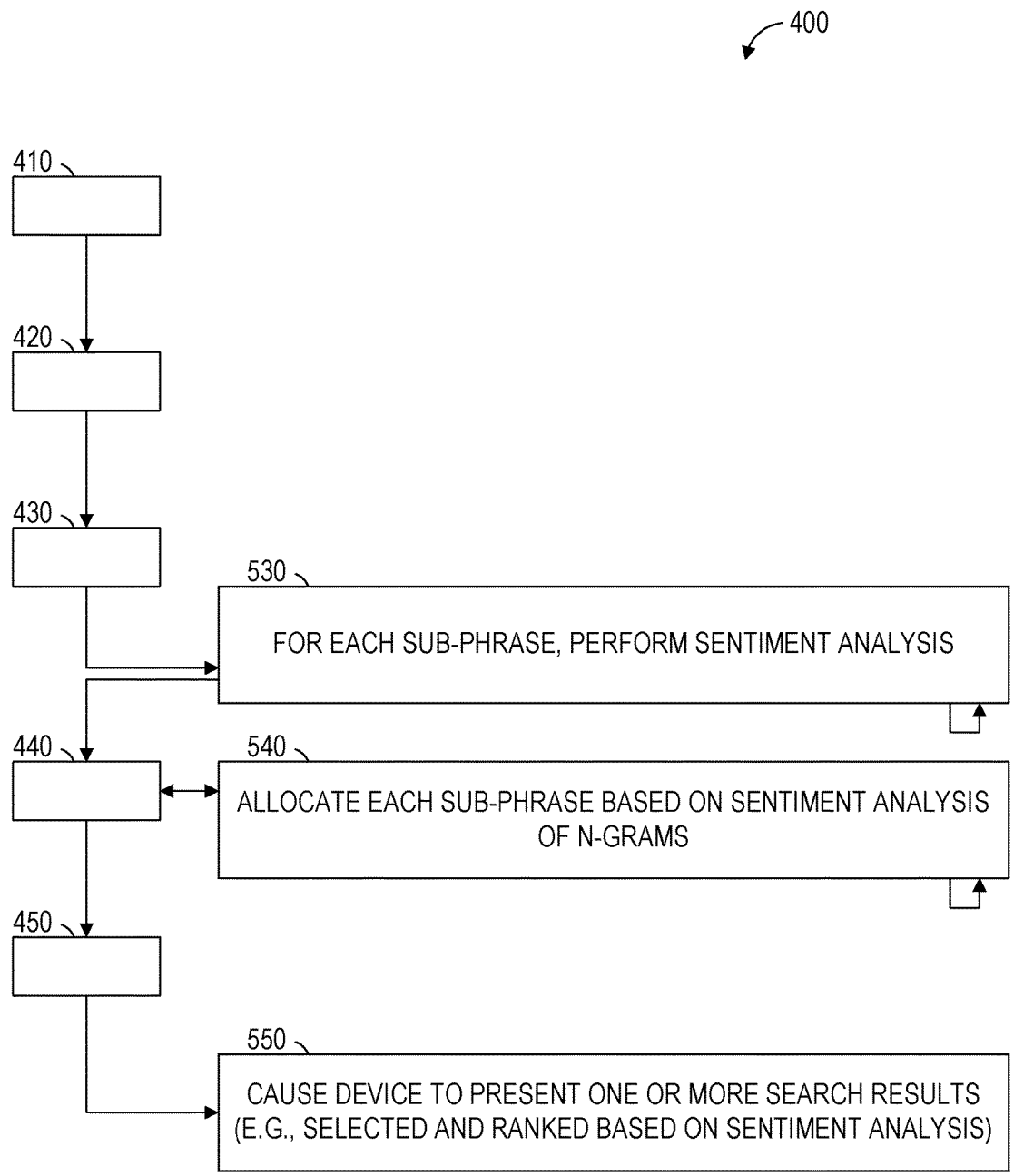

FIGS. 4 and 5 are flowcharts illustrating operations (e.g., of the search machine or of the device) in performing a method 400 of search deconstruction, reconstruction, and allocation, according to some example embodiments. Operations in the method 400 may be performed by the search machine 110, the device 130, or a combination of both, using components (e.g., modules) described above with respect to FIGS. 2 and 3, using one or more processors (e.g., microprocessors or other hardware processors), or using any suitable combination thereof. In some example embodiments, similar components or processors are present in the device 150, and the device 150 is accordingly configured to perform the method 400. As shown in FIG. 4, the method 400 includes operations 410, 420, 430, 440, and 450.

In operation 410, the responder 210 accesses a phrase generated by the user 132. For example, supposing that the user 132 communicated the phrase, "I want a popular 3-star hotel under $200 that's close to a coffee shop," the responder 210 accesses this phrase. The accessing of this phrase may be a result of the user 132 submitting the phrase (e.g., via the device 130) as typed text into a text search interface or speaking a voice command (e.g., via the device 130) into a voice search interface. In some example embodiments, the accessing of this phrase is a result of the responder 210 receiving a message in a machine-monitored message conversation (e.g., email conversation, instant message conversation, phone conversation, videoconference, or any suitable combination thereof).

In operation 420, the deconstructor 220 deconstructs the phrase into n-grams. This may be performed by recognizing, detecting, or otherwise identifying its constituent n-grams (e.g., words or other tokens), which may be recognized, detected, or otherwise identified by intervening textual spaces (e.g., whitespace characters), punctuation (e.g., punctuation characters), or both, within the phrase.

In operation 430, the reconstructor 230 reconstructs a group of multiple sub-phrases based on the n-grams in the phrase. The reconstructor 230 may utilize (e.g., via request or command) the natural language processor 260 to reconstruct (e.g., build) the sub-phrases. The natural language processor 260 may perform an analysis of the n-grams and thereby determine which n-grams are nouns, which n-grams are noun modifiers, which n-grams are adjectives, and which n-grams are used as other parts of speech. For example, supposing the phrase is "I want a popular 3-star hotel under $200 that's close to a coffee shop," the reconstructor 230 (e.g., with input from the natural language processor 260) may generate (e.g., construct or reconstruct) the following set of sub-phrases (e.g., clauses): "popular hotel," "3-star hotel," "under $200 hotel," and "hotel close to coffee shop."

According to some example embodiments, in performing operation 430, the reconstructor 230 (e.g., with input from the natural language processor 260) performs a grammatical analysis of the n-grams in the phrase and their location (e.g., position) within the phrase. For example, if an n-gram is an adjective (e.g., "popular") or an adjective clause (e.g., "extremely popular and fancy"), the reconstructor 230 invokes an NLP dependency parser graph to link the n-gram to a noun (e.g., a key noun, such as "hotel") in the phrase. In cases where an adjective occurs without a noun, the reconstructor 230 infers a default noun based on the communication context in which the phrase was used. For example, if the user 132 communicated the phrase as part of a hotel search (e.g., by typing or speaking the phrase into a search interface, such as a hotel search interface), or if the user 132 communicated the phrase as part of a machine-monitored message (e.g., email or instant message) conversation regarding hotels, the reconstructor 230 selects the word "hotel" as the default noun for linking to an adjective or adjective clause.

In greater detail, performance of operation 430 may include one or more of the following internal operations, which, for clarity, are presently described in the context of the above example in which the phrase is "I want a popular 3-star hotel under $200 that's close to a coffee shop." Taking the n-grams from operation 420 as input, the reconstructor 230 calculates a dependency tree and then uses the dependency tree to reconstruct (e.g., build) a set of sub-phrases (e.g., a set of distinct combinations of the n-grams) that includes at least the following sub-phrases: "popular" (e.g., as an adjective that is dependent on the key noun "hotel"), "3-star" (e.g., as an adjective clause that is dependent on the key noun "hotel" and has an attribute type of "stars" or "star rating"), "under $200" (e.g., as an adjective clause that depends on the key noun "hotel" and has an attribute type of "number" or "price"), and "coffee shop" (e.g., as a compound noun phrase that is not dependent on the key noun "hotel").

In operation 440, the allocator 240 allocates (e.g., assigns, maps, or otherwise links) each sub-phrase in the group of sub-phrases to a corresponding data source selected from a plurality of data sources. For example, the sub-phrase "popular hotel" may be allocated to the hotel trend database 115; the sub-phrase "3-star hotel" may be allocated to the hotel rating database 117; the sub-phrase "under $200 hotel" may be allocated to the hotel pricing database 120; and the sub-phrase "hotel close to coffee shop" may be allocated to the POI database 122. The allocator 240 may utilize the natural language processor 260 to allocate the sub-phrases.

In greater detail, performance of operation 440 may include one or more of the following internal operations, which for clarity are presently described in the context of the above example in which the phrase is "I want a popular 3-star hotel under $200 that's close to a coffee shop." In particular, the n-gram "coffee shop" may be treated in various ways, according to various example embodiments.

In some example embodiments, the allocator 240 (e.g., with or without input from the natural language processor 260) fails to recognize the n-gram "coffee shop" as having any particular meaning. In such a case, the allocator 240 may allocate the sub-phrase "hotel close to coffee shop" to a document search engine or other document database that stores text documents describing various hotels (e.g., news articles, marketing literature, reviews, or summaries regarding hotels). Moreover, in situations where the document search engine or other document database is specifically for storing hotel information (e.g., exclusively), the allocator 240 may later use the simpler n-gram "coffee shop" instead of this entire sub-phrase "hotel close to coffee shop" when executing a search of the document search engine or other document database. For purposes of discussion herein, this potential execution path can be considered as a first execution path.

In certain example embodiments, the allocator 240 (e.g., with or without input from the natural language processor 260) recognizes the n-gram "coffee shop" as identifying a searchable category (e.g., is or includes an identifier of the category or a synonym thereof) supported by an API of a data source (e.g., a POI API supported the POI database 122). In such a case, the allocator 240 may allocate the sub-phrase "hotel close to coffee shop" to that data source (e.g., POI database 122) and later utilize that API when executing a search of that data source (e.g., by making one or more API calls to submit the n-gram "coffee shop" or a synonym thereof). Continuing the above example, if the API corresponds to the POI database 122, the allocator 240 may invoke the API to obtain a list of those hotels that the POI database 122 has categorized, described, or otherwise indicated as being "close to [a] coffee shop." This may have the effect of adopting or otherwise incorporating a geographic restriction (e.g., a maximum distance from a coffee shop)

already present in the POI database 122 into the search results to be obtained from the POI database 122 (e.g., without actually specifying the maximum distance from a coffee shop). For purposes of discussion herein, this potential execution path can be considered as a second execution path.

In various example embodiments, the allocator 240 (e.g., with or without input from the natural language processor 260) recognizes the n-gram "coffee shop" as the name of a single business already represented in one or more of the data sources accessible by the search machine 110. This recognition may be performed based on NLP factors, such as use of capitalization or use of a definite article (e.g., "The"). For example, a coffee shop may be literally named "Coffee Shop," "The Coffee Shop," or "Joe's Coffee Shop," and this coffee shop may be represented in the POI database 122 or another database (e.g., a restaurant database, which may be maintained and operated by the entity that maintains and operates the search machine 110). Such recognition may be performed based on a comparison (e.g., by the allocator 240) of n-grams and a subsequent determination (e.g., by the allocator 240) that the n-gram "coffee shop" matches one or more n-grams that correspond to the actual coffee shop (e.g., n-grams that are mapped by the POI database 122 to the actual coffee shop). In some cases, the POI database 122 stores the location of the coffee shop (e.g., street address or global positioning system (GPS) coordinates), and the allocator 240 may later search for hotels within a threshold distance (e.g., a maximum radius) of the coffee shop's location. For purposes of discussion herein, this potential execution path can be considered as a third execution path. According to some example embodiments, the allocator 240 is configured to choose an execution path among the first, second, and third execution paths, as discussed in greater detail below.

As another illustrative example, for purposes of clarity, it may be helpful to consider the sub-phrase "near Stinson Beach." A first n-gram is "beach," and the allocator 240 (e.g., with or without input from the natural language processor 260) may determine that the n-gram "beach" refers to a geographic feature. Based on this determination, in some example embodiments, the allocator 240 selects a text-query optimized database (e.g., a general database or the POI database 122) to search for hotels that are associated with a beach, search for things near a representation of a beach (e.g., within a geographical region described by the context of the communication that included the sub-phrase "near Stinson Beach"), or both.

Continuing the above illustrative example, a second n-gram is the compound noun "stinson beach," in reference to an actual beach named "Stinson Beach," and the allocator 240 (e.g., with or without input from the natural language processor 260) may accordingly recognize that the n-gram "Stinson Beach" refers to a specific POI. Based on this recognition, in some example embodiments, the allocator 240 selects a specialized (e.g., dedicated) database (e.g., the POI database 122) to search for hotels within a threshold distance (e.g., maximum radius) of Stinson Beach.

Further continuing the above illustrative example, a third n-gram is also "stinson beach," but here referencing a neighborhood with the same name as the actual beach. The allocator 240 (e.g., with or without input from the natural language processor 260) may accordingly recognize this possibility. Based on this recognition, in some example embodiments, the allocator 240 selects a different specialized database (e.g., a neighborhood database or other local knowledge database) to perform a location-limited query of hotels within or near the neighborhood (e.g., as defined by a geographical polygon that corresponds to the neighborhood, as assigned by the specialized database). In some situations, the specialized database (e.g., hotel rating database 117) associates hotels with their respective neighborhoods (e.g., in a corresponding metadata), and the allocator 240 may select the specialized database to search for those hotels that are already tagged as being in or near the neighborhood.

Still further continuing the above illustrative example, in situations where the reconstructor 230 uses an NLP dependency parser graph, the allocator 240 may use the NLP dependency parser graph to detect that a fourth n-gram is "stinson beach," but here referencing an NLP-tagged named entity (e.g., a company or other organization named after the actual beach). Based on this detection, the allocator 240 may select a further different specialized database (e.g., a corporate directory, an organizational search engine, or other listing of named entities) to search (e.g., via a corresponding API) for a location of the named entity. Based on this location, the allocator 240 may select the POI database 122 to search for hotels within a threshold distance of the named entity.

In addition, in certain example embodiments, sentiment analysis is performed on the n-grams or the sub-phrases in which they appear. Such sentiment analysis of an n-gram may indicate a level of specificity for the n-gram or for the sub-phrase in which the n-gram appears. According to various example embodiments, the indicated level of specificity forms a basis (e.g., among other bases) for weighting allocation of the sub-phrase in operation 440. In such example embodiments, the sentiment analyzer 250 performs the sentiment analysis for a given n-gram or its sub-phrase, and the allocator 240 selects a general database (e.g., a general-purpose search engine, such as Google® or Bing®) if the level of specificity is low (e.g., below a threshold value) or selects a specialized database (e.g., from among multiple specialized databases) if the level of specificity is high (e.g., at or above a threshold value).

For performing operation 440, according to certain example embodiments, the allocator 240 is hardcoded with information regarding the data sources available for allocation (e.g., identifiers, network addresses, and descriptions of the hotel trend database 115, the hotel rating database 117, the hotel pricing database 120, and the POI database 122). In alternative example embodiments, the application 200 is hardcoded with such information.

A trie is an example of a suitable data structure for storing such hardcoded information in the application 200, the allocator 240, or both, and such a trie accordingly may be hardcoded into the allocator 240, the application 200, or both. The trie may store many commonly used n-grams and relationships among the n-grams, as well as store metadata (e.g., descriptors, such as "type") about the n-grams. In some implementations, the trie stores and associates identifiers of data sources with corresponding n-grams (e.g., an identifier of the hotel pricing database 120 with the n-gram "$200" and also with the n-grams "$300," "$550," and "$1000"). This may enable fast lookups (e.g., in real time or close to real time) at the point where an n-gram comparison determines that a match exists. In certain implementations, the trie stores and associates identifiers of data sources with corresponding sub-phrases or corresponding phrases in their entirety. Furthermore, an identifier of a data source (e.g., a name or address of the POI database 122) may be or otherwise function as an identifier of its corresponding API.

In alternative example embodiments, without hardcoding the trie into the allocator 240 or into the application 200, the trie may be obtained dynamically at any point prior to use. For example, the trie may be maintained and kept up-to-date by the search machine 110, the device 150, or a third-party server machine, and the allocator 240, the application 200, or both, may obtain (e.g., request and receive) the trie as part (e.g., a precursor task, a subroutine, or a portion) of performing operation 440.

In operation 450, for each allocated sub-phrase among the allocated sub-phrases, the allocator 240 executes a search of the corresponding data source by communicating the allocated sub-phrase to the corresponding data source to obtain search results from the data source to which the sub-phrase is allocated. Continuing the previous example, the allocator 240 may execute, request, command, or otherwise initiate a search of the hotel trend database 115 by communicating (e.g., submitting) the sub-phrase "popular hotel" to the hotel trend database 115. Similarly, the allocator 240 may initiate a search of the hotel rating database 117 by communicating the sub-phrase "3-star hotel" to the hotel rating database 117. Likewise, the allocator 240 may initiate a search of the hotel pricing database 120 by communicating the sub-phrase "under $200 hotel" to the hotel pricing database 120 (e.g., by sending the sub-phrase within an API call or other request). In like fashion, the allocator 240 may initiate a search of the POI database 122 by communicating the sub-phrase "hotel close to coffee shop" to the POI database 122 (e.g., by including the sub-phrase in an API call or other request). Accordingly, different sub-phrases reconstructed from the n-grams parsed from the phrase are allocated and distributed among multiple data sources for obtaining different sets of partial search results.

In greater detail, performance of operation 450 may include one or more of the following internal operations, which for clarity are presently described in the context of the above example in which the phrase is "I want a popular 3-star hotel under $200 that's close to a coffee shop." According to some example embodiments, prior to executing the searches of the various data sources, the allocator 240 generates (e.g., constructs) a general query that incorporates and organizes the reconstructed sub-phrases into a single query suitable for submission to a general search engine or general database (e.g., in contrast with a specialized search engine or specialized database, such as the hotel trend database 115, the hotel rating database 117, the hotel pricing database 120, or the POI database 122). Continuing the above example, the reconstructor 230 may generate the following query string as the general query:

[phrase "popular hotel" present] AND [stars=3+−0.5] AND [phrase like "near coffee shop" present].

The allocator 240 may then execute, request, command, or otherwise initiate a search of a general data source (e.g., a general search engine commonly used by the public, such as Google® or Bing®, or a general search engine maintained and operated by the same entity as the search machine 110) by communicating this query string to the general data source. The results of this general search may be treated as additional partial results and accordingly combined with the different sets of partial search results obtained from the data sources (e.g., specialized data sources) to which the sub-phrases were allocated in operation 440.

As shown in FIG. 5, in addition to any one or more of the operations previously described, the method 400 may include one or more of operations 530, 540, and 550, according to some example embodiments. Operation 530 may be performed between operation 430 and 440. In operation 530, for each sub-phrase obtained from operation 430, the sentiment analyzer 250 performs sentiment analysis on the sub-phrase, which may be performed by performing a sentiment analysis of the n-grams within that sub-phrase. As part of performing such sentiment analysis, the sentiment analyzer 250 may invoke (e.g., execute, request, command, or otherwise initiate) one or more functions of the natural language processor 260 (e.g., via a corresponding API).

As an illustrative example, consider a situation in which the user 132 communicated the phrase "I want a hotel with great service at a decent price." The sentiment analysis performed by the sentiment analyzer 250 (e.g., with input from the natural language processor) may determine that "service" is very important to the user 132 and that "price" is somewhat important (e.g., important, but to a lesser degree than service), for example, based on semantic processing of the adjectives "great" and "decent" and where these adjectives occur within the phrase. The relative degrees of importance may be used (e.g., by the responder 210) later in selecting and presenting (e.g., ranking, sorting, highlighting, or arranging) a subset of the search results. In this illustrative example, the responder 210 weights search results obtained from the sub-phrase "hotel with great service" more strongly than search results obtained from the sub-phrase "hotel at a decent price."

In some example embodiments, the sentiment analyzer 250 also detects a communication context in which the phrase was used, and this communication context may be later used (e.g., by the responder 210) in selecting and presenting the subset of the search results. For example, the n-gram "decent price" may have a special meaning under certain market conditions or in certain times of the year (e.g., in that what is considered a decent price may be high at times when prices are expected to rise or fall at times when prices are expected to be low).

In certain example embodiments, sentiment analysis operates on word vectors that each represent a different n-gram. Each word vector may indicate degrees to which different semantic dimensions are represented by a given n-gram. For example, a word vector that represents (e.g., models) the n-gram "decent" may contain a value (e.g., 120) that falls within a range of possible values for a semantic dimension (e.g., a range of zero to 254, with the semantic dimension representing "quality" and with zero representing "poor" quality and 254 representing "great" quality). Multiple semantic dimensions may be represented by multiple values within a given word vector.

As noted above, sentiment analysis of an n-gram may indicate a level of specificity for the n-gram or for the sub-phrase in which the n-gram appears. According to various example embodiments, the indicated level of specificity forms a basis (e.g., among other bases) for weighting the search results obtained from the n-gram or from the sub-phrase that contains the n-gram. That is, the weight (e.g., weight value) assigned (e.g., by the responder 210) to search results obtained from an n-gram or from the sub-phrase in which it appears may be determined (e.g., calculated or generated) based on the specificity level of the n-gram.

Operation 540 may be performed as part (e.g., a precursor task, a subroutine, or a portion) of operation 440, in which the allocator 240 allocates each sub-phrase to a corresponding data source. In operation 540, the allocation for each sub-phrase is performed based on the corresponding sentiment analysis of the sub-phrase, as performed in operation 530.

Operation 550 may be performed after operation 450, in which the allocator 240 executes searches of the data sources that respectively correspond to the allocated sub-phrases. In operation 550, the responder 210 causes presentation of one or more of the search results obtained from operation 450. For example, the responder 210 may cause the device 130 of the user 132 to present (e.g., display via a display screen or speak via a synthesized voice) a selected subset of the search results. The search results in the selected subset may further be ranked, sorted, highlighted, or arranged based on (e.g., in accordance with) various weights (e.g., weight scalars, weight coefficients, or other mathematical weight values) applied to the search results or to the data sources from which the search results were obtained. Such weights may be determined (e.g., by the allocator 240 or by the responder 210) based on sentiment analysis (e.g., performed in operation 540 or separately invoked). Accordingly, a weight determined by sentiment analysis of a sub-phrase is a weight that corresponds to the sub-phrase, to the data source allocated to the sub-phrase, and to the search results obtained from the data source based on the sub-phrase.

As noted above, sentiment analysis may operate on word vectors that each represent a different n-gram. For example, vector distances may be calculated (e.g., by the sentiment analyzer 250) between a word vector and one or more extrema for a given dimension represented in the word vector. The extrema may be extreme vectors (e.g., maximum or minimum vectors), which may be reference word vectors that have extreme (e.g., maximum or minimum) values for the given dimension. After these vector distances are calculated, the responder 210 may determine the weight for the sub-phrase that contains the n-gram represented by the word vector, and this determination may be based on the vector distances.

As an example, a sentiment analysis by the sentiment analyzer 250 may determine that the word vector for the n-gram "popular" is more positive than negative, because the word vector has a shorter vector distance to the positive end of a desirability range (e.g., modeling a desirability dimension) than to the negative end of the desirability range. Based on this determination, the responder 210 may determine and allocate a weight value (e.g., proportionally, relative to the entire desirability range) to the sub-phrase "popular hotel" in which the n-gram "popular" appears.

The responder 210 may then use the determined weight value of the sub-phrase (e.g., "popular hotel") as a basis for ranking, sorting, highlighting, arranging, or otherwise presenting the selected subset of the search results (e.g., at least the search results obtained from the sub-phrase). For example, each search result in the selected subset of search results may include, indicate, or otherwise have a corresponding desirability score (e.g., an agony score or an ecstasy score), and the search results obtained from a given data source (e.g., the hotel trend database 115) may be increased or decreased (e.g., proportionally) based on the weight of the sub-phrase allocated to that data source (e.g., the weight calculated for and assigned to the sub-phrase "popular hotel").

For example, supposing weight values are supported in a range from −1.0 to 1.0, with −1.0 representing extreme low weight, with zero representing neutral weight, and with 1.0 representing extreme high weight, and also supposing that the weight value for the sub-phrase "popular hotel" is 0.5, the responder 210 may increase the desirability scores (e.g., ecstasy scores) of the search results obtained from the hotel trend database 115 by a multiplier (e.g., a scalar coefficient, such as the weight itself or a coefficient determined based on the weight). In some cases, a sufficiently low weight (e.g., below a threshold value, such as a minimum value) causes the responder 210 to entirely omit the search results obtained from the data source. For example, the responder 210 may omit all search results with weighted or otherwise adjusted desirability scores below a minimum threshold desirability score (e.g., 1.25 points out of a possible 10 points).

According to some example embodiments, a boost score (e.g., an additive bonus or other additional scalar value) is used instead of a multiplier. For example, search results obtained from the sub-phrase "popular hotel" may be given (e.g., by the responder 210) boost scores of 0.5 to their respective desirability scores. As another example, search results obtained from the sub-phrase "3-star hotel" may be given boost scores of 1.0 to their respective desirability scores if they are actual 3-star hotels or given boost scores of 0.5 if they are instead 2.5-star hotels or 3.5-star hotels. As a further example, search results obtained from the sub-phrase "hotel close to coffee shop" may be given a boost score according to the following formula: boost score=1.0−(0.01×[distance in yards or meters from the closest coffee shop]).

In example embodiments that include performance of a general query, as described above with respect to operation 450, the responder 210 combines (e.g., synthesizes or otherwise incorporates) the search results from the general query with the search results obtained from the data sources (e.g., specialized data sources) to which the sub-phrases were allocated. The responder 210 may then select a subset of the combined search results obtained from all these queries, both general and specialized. As noted above, the selected subset can then be further processed (e.g., ranked, sorted, highlighted, arranged) by the responder 210 for presentation (e.g., to the user 132) in operation 550.

According to certain example embodiments, in selecting the subset of the search results to present, the responder 210 may apply one or more filters. In particular, a filter may correspond to one of the sub-phrases, and the effect of the filter may be determined by the responder 210 based on the weight (e.g., determined based on sentiment analysis) applied to that corresponding sub-phrase. Continuing the above example, the responder 210 therefore may filter out hotels that are unavailable or over $200 per night in price.

According to various example embodiments, one or more of the methodologies described herein may facilitate modification of search criteria and distribution of the modified search criteria among multiple search engines or other databases (e.g., search deconstruction, reconstruction, and allocation). Moreover, one or more of the methodologies described herein may facilitate semantic processing of a search explicitly or implicitly communicated by a user, including monitoring and detection of a natural language query (e.g., in a search interface or in a machine-monitored electronic conversation). Hence, one or more of the methodologies described herein may facilitate faster retrieval of more precise and more accurate search results compared to capabilities of pre-existing systems and methods.

When these effects are considered in aggregate, one or more of the methodologies described herein may obviate a need for certain efforts or resources that otherwise would be involved in such modification of search criteria and distribution of the modified search criteria among multiple search engines or other databases. Efforts expended by a user in performing these tasks or obtaining the benefits thereof may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 6:
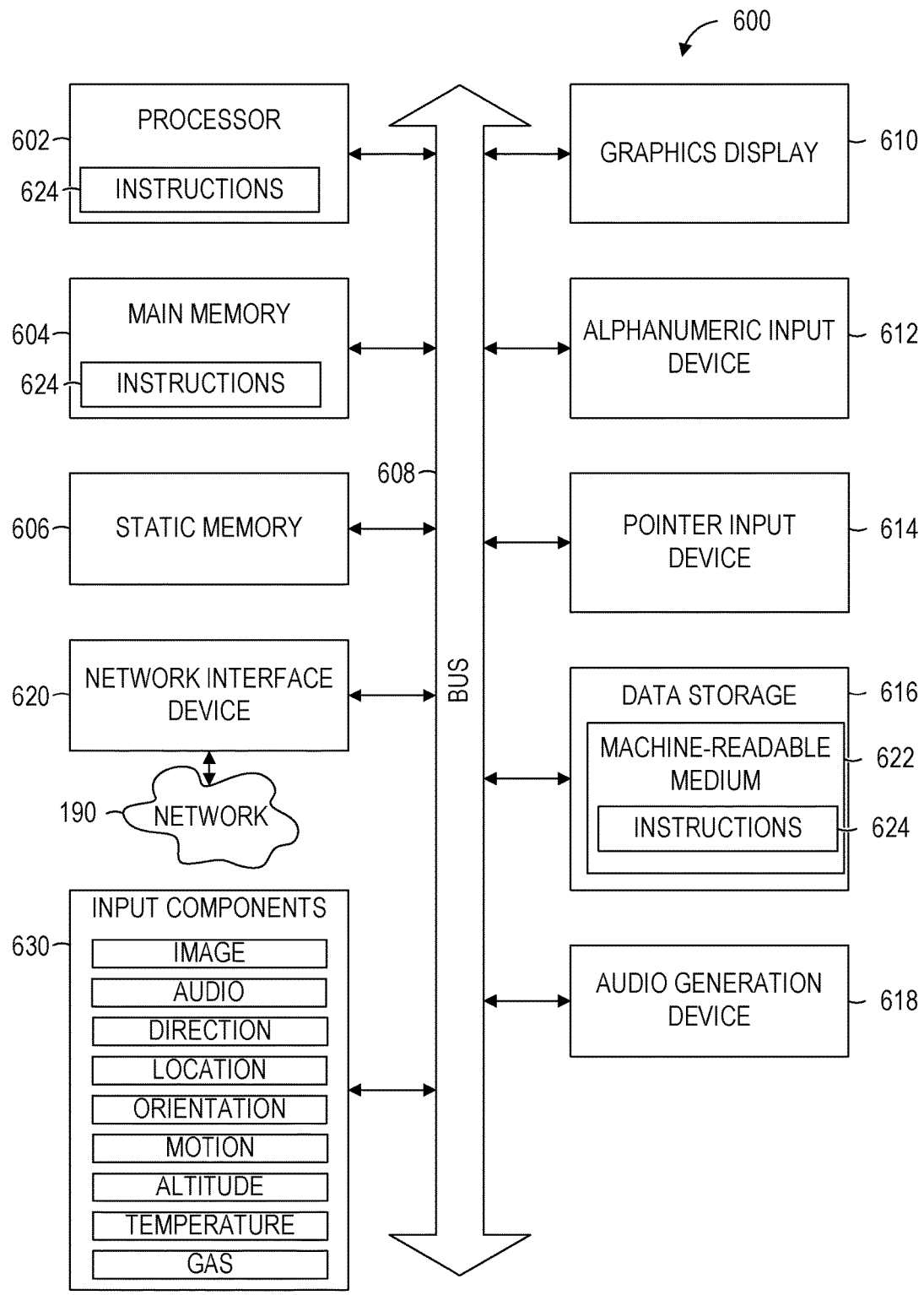
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be communicatively coupled (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include any collection of machines that individually or jointly execute the instructions 624 to perform all or part of any one or more of the methodologies discussed herein.

The machine 600 includes a processor 602 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 604, and a static memory 606, which are configured to communicate with each other via a bus 608. The processor 602 contains solid-state digital microcircuits (e.g., electronic, optical, or both) that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein. In some example embodiments, the processor 602 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 600 with at least the processor 602, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a pointer input device 614 (e.g., a mouse, a touchpad, a touchscreen, a trackball, a joystick, a stylus, a motion sensor, an eye tracking device, a data glove, or other pointing instrument), a data storage 616, an audio generation device 618 (e.g., a sound card, an amplifier, a speaker, a headphone jack, or any suitable combination thereof), and a network interface device 620.

The data storage 616 (e.g., a data storage device) includes the machine-readable medium 622 (e.g., a tangible and non-transitory machine-readable storage medium) on which are stored the instructions 624 embodying any one or more of the methodologies or functions described herein. The instructions 624 may also reside, completely or at least partially, within the main memory 604, within the static memory 606, within the processor 602 (e.g., within the processor's cache memory), or any suitable combination thereof, before or during execution thereof by the machine 600. Accordingly, the main memory 604, the static memory 606, and the processor 602 may be considered machine-readable media (e.g., tangible and non-transitory machine-readable media). The instructions 624 may be transmitted or received over the network 190 via the network interface device 620. For example, the network interface device 620 may communicate the instructions 624 using any one or more transfer protocols (e.g., hypertext transfer protocol (HTTP)).

In some example embodiments, the machine 600 may be a portable computing device (e.g., a smart phone, a tablet computer, or a wearable device), and may have one or more additional input components 630 (e.g., sensors or gauges). Examples of such input components 630 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 624 for execution by the machine 600 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 624).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
accessing, by one or more hardware processors of a machine, a phrase communicated by a user device;
deconstructing, by one or more hardware processors of the machine, the phrase into n-grams by parsing the accessed phrase;
generating, by one or more hardware processors of the machine, a plurality of sub-phrases based on the n-grams obtained by the deconstructing of the phrase, each sub-phrase in the plurality of sub-phrases including a different subset of the n-grams;
assigning, by one or more hardware processors of the machine, each sub-phrase in the plurality of sub-phrases to a corresponding data source selected for the sub-phrase from a plurality of data sources; and
by one or more hardware processors of the machine, for each assigned sub-phrase, executing a corresponding search of the corresponding selected data source by submitting the assigned sub-phrase to the corresponding selected data source in a corresponding query that causes the corresponding selected data source to provide search results based on the assigned sub-phrase.

A second embodiment provides a method according to the first embodiment, wherein:
the accessing of the phrase communicated by the user device includes receiving the phrase in a primary query submitted by the user device to a search engine; and
the method further comprises:
obtaining the search results for each assigned sub-phrase in the plurality of sub-phrases;
compiling the search results obtained for each assigned sub-phrase in the plurality of sub-phrases; and
causing at least a subset of the compiled search results to be presented in response to the primary query submitted by the user device.

A third embodiment provides a method according to the first embodiment or the second embodiment, wherein:
the accessing of the phrase communicated by the user device includes detecting the phrase in a first message sent by the user device to one or more other user devices; and
the method further comprises:
obtaining the search results for each assigned sub-phrase in the plurality of sub-phrases;
compiling the search results obtained for each assigned sub-phrase in the plurality of sub-phrases; and
causing at least a subset of the compiled search results to be presented within a message conversation among the user device and the one or more other user devices.

A fourth embodiment provides a method according to any of the first through third embodiments, wherein:
the generating of the plurality of sub-phrases includes calculating a dependency tree based on the n-grams obtained by the deconstructing of the phrase, the plurality of sub-phrases being generated based on the dependency tree calculated based on the n-grams.

A fifth embodiment provides a method according to any of the first through fourth embodiments, wherein:
the assigning includes:
performing an analysis of a first sub-phrase among the plurality of sub-phrases, the analysis failing to recognize meaning in the first sub-phrase;
selecting a document search engine for the first sub-phrase based on the analysis failing to recognize meaning in the first sub-phrase; and
assigning the first sub-phrase to the selected document search engine.

A sixth embodiment provides a method according to any of the first through fifth embodiments, wherein:
the assigning includes:
performing an analysis of a first sub-phrase among the plurality of sub-phrases, the analysis recognizing the first sub-phrase as a searchable category supported by a first application programming interface (API) of a first data source among the plurality of data sources;
selecting the first data source for the first sub-phrase based on the analysis recognizing the first sub-phrase as the searchable category supported by the first API of the first data source; and
assigning the first sub-phrase to the selected first data source.

A seventh embodiment provides a method according to the sixth embodiment, wherein:
for the first sub-phrase, the executing of the corresponding search of the corresponding selected first data source includes invoking the first API of the first data source, the invoking of the first API causing the corresponding search of the first data source to be executed; and
for the first sub-phrase, the corresponding search of the corresponding selected first data source includes a geographic restriction without specifying the geographic restriction in the invoking of the first API.

An eighth embodiment provides a method according to any of the first through seventh embodiments, wherein:
the assigning includes:
performing an analysis of a first sub-phrase among the plurality of sub-phrases, the analysis recognizing the first sub-phrase as a name of an entity represented in a first data source among the plurality of data sources;
selecting the first data source for the first sub-phrase based on the analysis recognizing the first sub-phrase as the name of the entity represented in the first data source; and
assigning the first sub-phrase to the selected first data source.

A ninth embodiment provides a method according to any of the first through eighth embodiments, wherein:
the assigning includes:
performing an analysis of a first sub-phrase among the plurality of sub-phrases, the analysis recognizing the first sub-phrase as a natural geographic feature;
selecting a first data source among the plurality of data sources for the first sub-phrase based on the analysis recognizing the first sub-phrase as the natural geographic feature; and
assigning the first sub-phrase to the selected first data source.

A tenth embodiment provides a method according to any of the first through ninth embodiments, wherein:
the assigning includes:
performing an analysis of a first sub-phrase among the plurality of sub-phrases, the analysis recognizing the first sub-phrase as a name of a neighborhood within a city;
selecting a first data source among the plurality of data sources for the first sub-phrase based on the analysis recognizing the first sub-phrase as the name of the neighborhood within the city; and
assigning the first sub-phrase to the selected first data source.

An eleventh embodiment provides a method according to any of the first through tenth embodiments, wherein:
the assigning includes:
performing an analysis of a first sub-phrase among the plurality of sub-phrases, the analysis determining a level of specificity in the first sub-phrase;
selecting a first data source among the plurality of data sources for the first sub-phrase based on the level of specificity in the first sub-phrase; and
assigning the first sub-phrase to the selected first data source.

A twelfth embodiment provides a method according to any of the first through eleventh embodiments, further comprising:
generating a single general query that includes the generated plurality of sub-phrases;
obtaining the search results for each assigned sub-phrase in the plurality of sub-phrases;
obtaining supplemental search results by communicating the single general query to a further data source; and
compiling the search results obtained for each assigned sub-phrase with the obtained supplemental search results from the single general query.

A thirteenth embodiment provides a method according to any of the first through twelfth embodiments, wherein:
the assigning includes performing sentiment analyses of the plurality of sub-phrases, the sentiment analyses indicating that a first sub-phrase in the plurality has a greater degree of importance than a second sub-phrase in the plurality; and
the method further comprises:
obtaining the search results for each assigned sub-phrase in the plurality of sub-phrases;
weighting the search results obtained for each assigned sub-phrase in the plurality of sub-phrases, the weighting being based on corresponding degrees of importance for the plurality of sub-phrases; and
ranking the weighted search results based on their corresponding degrees of importance.

A fourteenth embodiment provides a method according to the thirteenth embodiment, further comprising:
causing at least a subset of the weighted search results to be presented in response to a query submitted by the user device, the subset of the weighted search results being ranked based on their corresponding degrees of importance.

A fifteenth embodiment provides a method according to any of the first through thirteenth embodiments, wherein:
the assigning includes performing sentiment analyses of the plurality of sub-phrases, the sentiment analyses indicating that a first sub-phrase in the plurality has a greater level of specificity than a second sub-phrase in the plurality; and
the method further comprises:
weighting the search results obtained for each assigned sub-phrase in the plurality of sub-phrases, the weighting being based on corresponding levels of specificity for the plurality of sub-phrases; and
ranking the weighted search results based on their corresponding levels of specificity.

A sixteenth embodiment provides a method according to the fifteenth embodiment, further comprising:
causing at least a subset of the weighted search results to be presented in response to a query submitted by the user device, the subset of the weighted search results being ranked based on their corresponding levels of specificity.

A seventeenth embodiment provides a machine-readable medium (e.g., a non-transitory machine-readable storage medium) comprising instructions that, when executed by one or more hardware processors of a machine, cause the machine to perform operations comprising:
accessing a phrase communicated by a user device;
deconstructing the phrase into n-grams by parsing the accessed phrase;
generating a plurality of sub-phrases based on the n-grams obtained by the deconstructing of the phrase, each sub-phrase in the plurality of sub-phrases including a different subset of the n-grams;
assigning each sub-phrase in the plurality of sub-phrases to a corresponding data source selected for the sub-phrase from a plurality of data sources; and
for each assigned sub-phrase, executing a corresponding search of the corresponding selected data source by submitting the assigned sub-phrase to the corresponding selected data source in a corresponding query that causes the corresponding selected data source to provide search results based on the assigned sub-phrase.

An eighteenth embodiment provides a machine-readable medium according to the seventeenth embodiment, wherein: the accessing of the phrase communicated by the user device includes detecting the phrase in a first message sent by the user device to one or more other user devices; and
the operations further comprise:
compiling the search results obtained for each assigned sub-phrase in the plurality of sub-phrases; and
causing at least a subset of the compiled search results to be presented within a message conversation among the user device and the one or more other user devices.

A nineteenth embodiment provides a system (e.g., a computer system or other computing apparatus) comprising: one or more processors; and
a memory storing instructions that, when executed by at least one processor among the one or more processors, cause the system to perform operations comprising:
accessing a phrase communicated by a user device;
deconstructing the phrase into n-grams by parsing the accessed phrase;
generating a plurality of sub-phrases based on the n-grams obtained by the deconstructing of the phrase, each sub-phrase in the plurality of sub-phrases including a different subset of the n-grams;
assigning each sub-phrase in the plurality of sub-phrases to a corresponding data source selected for the sub-phrase from a plurality of data sources; and
for each assigned sub-phrase, executing a corresponding search of the corresponding selected data source by submitting the assigned sub-phrase to the corresponding selected data source in a corresponding query that causes the corresponding selected data source to provide search results based on the assigned sub-phrase.

A twentieth embodiment provides a system according to the nineteenth embodiment, wherein:
the accessing of the phrase communicated by the user device includes detecting the phrase in a first message sent by the user device to one or more other user devices; and
the operations further comprise:
compiling the search results obtained for each assigned sub-phrase in the plurality of sub-phrases; and
causing at least a subset of the compiled search results to be presented within a message conversation among the user device and the one or more other user devices.

A twenty-first embodiment provides a carrier medium carrying machine-readable instructions for controlling a machine to carry out the method of any of the first through sixteenth embodiments.

What is claimed is:

1. A method comprising:
accessing, by one or more processors of a machine, a phrase communicated by a user device;
deconstructing, by one or more processors of the machine, the phrase into n-grams by parsing the accessed phrase;
generating, by one or more processors of the machine, a plurality of sub-phrases based on the n-grams obtained by the deconstructing of the phrase, each sub-phrase in the plurality of sub-phrases including a different subset of the n-grams;
assigning, by one or more processors of the machine, each sub-phrase in the plurality of sub-phrases to a corresponding data source selected for that sub-phrase from among a plurality of available data sources, the assigning of a first sub-phrase in the plurality of sub-phrases to a corresponding first data source among the plurality of available data sources including:
determining a level of specificity of the first sub-phrase by invoking a natural language processor via a corresponding application programming interface (API) of the natural language processor;
comparing the determined level of specificity of the first sub-phrase to a threshold level of specificity; and
selecting the first data source for assignment to the first sub-phrase based on the comparing of the determined level of specificity to the threshold level of specificity; and
by one or more processors of the machine, for each assigned sub-phrase, executing a corresponding search of the corresponding selected data source by submitting the assigned sub-phrase to the corresponding selected data source in a corresponding API call that causes the corresponding selected data source to provide search results based on the assigned sub-phrase.

2. The method of claim 1, wherein:
the accessing of the phrase communicated by the user device includes receiving the phrase in a primary query submitted by the user device to a search engine; and
the method further comprises:
compiling the search results obtained for each assigned sub-phrase in the plurality of sub-phrases; and
causing at least a subset of the compiled search results to be presented in response to the primary query submitted by the user device.

3. The method of claim 1, wherein:
the accessing of the phrase communicated by the user device includes detecting the phrase in a first message sent by the user device to one or more other user devices; and
the method further comprises:
compiling the search results obtained for each assigned sub-phrase in the plurality of sub-phrases; and
causing at least a subset of the compiled search results to be presented within a message conversation among the user device and the one or more other user devices.

4. The method of claim 1, wherein:
the generating of the plurality of sub-phrases includes calculating a dependency tree based on the n-grams obtained by the deconstructing of the phrase, the plurality of sub-phrases being generated based on the dependency tree calculated based on the n-grams.

5. The method of claim 1, wherein:
the assigning of each sub-phrase in the plurality of sub-phrases to a corresponding data source includes:
performing an analysis of a second sub-phrase among the plurality of sub-phrases, the analysis failing to recognize meaning in the second sub-phrase;
selecting a document search engine for the second sub-phrase based on the analysis failing to recognize meaning in the second sub-phrase; and
assigning the second sub-phrase to the selected document search engine.

6. The method of claim 1, wherein:
the API of the natural language processor is a first API; and
the assigning of each sub-phrase in the plurality of sub-phrases to a corresponding data source includes:
performing an analysis of a second sub-phrase among the plurality of sub-phrases, the analysis recognizing the second sub-phrase as a searchable category supported by a second API of a second data source among the plurality of data sources;
  selecting the second data source for the second sub-phrase based on the analysis recognizing the second sub-phrase as the searchable category supported by the second API of the second data source; and
  assigning the second sub-phrase to the selected second data source.

7. The method of claim 6, wherein:
for the second sub-phrase, the executing of the corresponding search of the corresponding selected second data source includes invoking the second API of the second data source, the invoking of the second API causing the corresponding search of the second data source to be executed; and
  for the second sub-phrase, the corresponding search of the corresponding selected second data source includes a geographic restriction without specifying the geographic restriction in the invoking of the second API.

8. The method of claim 1, wherein:
the assigning of each sub-phrase in the plurality of sub-phrases to a corresponding data source includes:
  performing an analysis of a second sub-phrase among the plurality of sub-phrases, the analysis recognizing the second sub-phrase as a name of an entity represented in a second data source among the plurality of data sources;
  selecting the second data source for second sub-phrase based on the analysis recognizing the second sub-phrase as the name of the entity represented in the second data source; and
  assigning the second sub-phrase to the selected second data source.

9. The method of claim 1, wherein:
the assigning of each sub-phrase in the plurality of sub-phrases to a corresponding data source includes:
  performing an analysis of a second sub-phrase among the plurality of sub-phrases, the analysis recognizing the second sub-phrase as a natural geographic feature;
  selecting a second data source among the plurality of data sources for the second if sub-phrase based on the analysis recognizing the second sub-phrase as the natural geographic feature; and
  assigning the second sub-phrase to the selected first data source.

10. The method of claim 1, wherein:
the assigning of each sub-phrase in the plurality of sub-phrases to a corresponding data source includes:
  performing an analysis of a second first sub-phrase among the plurality of sub-phrases, the analysis recognizing the second sub-phrase as a name of a neighborhood within a city;
  selecting a second data source among the plurality of data sources for the second sub-phrase based on the analysis recognizing the second sub-phrase as the name of the neighborhood within the city; and
  assigning the second sub-phrase to the selected second data source.

11. The method of claim 1, further comprising:
generating a single general query that includes the generated plurality of sub-phrases;
obtaining supplemental search results by communicating the single general query to a further data source; and
compiling the search results obtained for each assigned sub-phrase with the obtained supplemental search results from the single general query.

12. The method of claim 1, wherein:
the assigning of each sub-phrase in the plurality of sub-phrases to a corresponding data source includes performing sentiment analyses of the plurality of sub-phrases, the sentiment analyses indicating that a second sub-phrase in the plurality has a greater degree of importance than a third sub-phrase in the plurality; and
the method further comprises:
weighting the search results obtained for each assigned sub-phrase in the plurality of sub-phrases, the weighting being based on corresponding degrees of importance for the plurality of sub-phrases; and
ranking the weighted search results based on their corresponding degrees of importance.

13. The method of claim 12, further comprising:
causing at least a subset of the weighted search results to be presented in response to a query submitted by the user device, the subset of the weighted search results being ranked based on their corresponding degrees of importance.

14. The method of claim 1, wherein:
the first sub-phrase in the plurality has a greater level of specificity than a second sub-phrase in the plurality; and
the method further comprises:
weighting the search results obtained for each assigned sub-phrase in the plurality of sub-phrases, the weighting being based on corresponding levels of specificity for the plurality of sub-phrases; and
ranking the weighted search results based on their corresponding levels of specificity.

15. The method of claim 14, further comprising:
causing at least a subset of the weighted search results to be presented in response to a query submitted by the user device, the subset of the weighted search results being ranked based on their corresponding levels of specificity.

16. A non-transitory machine-readable storage medium comprising instructions that, when executed by one or more processors of a machine, cause the machine to perform operations comprising:
  accessing a phrase communicated by a user device;
  deconstructing the phrase into n-grams by parsing the accessed phrase;
  generating a plurality of sub-phrases based on the n-grams obtained by the deconstructing of the phrase, each sub-phrase in the plurality of sub-phrases including a different subset of the n-grams;
  assigning each sub-phrase in the plurality of sub-phrases to a corresponding data source selected for that sub-phrase from among a plurality of available data sources,
    the assigning of a first sub-phrase in the plurality of sub-phrases to a corresponding first data source among the plurality of available data sources including:
      determining a level of specificity of the first sub-phrase by invoking a natural language processor via a corresponding application programming interface (API) of the natural language processor;
      comparing the determined level of specificity of the first sub-phrase to a threshold level of specificity; and selecting the first data source for assignment to the first sub-phrase based on the comparing of the determined level of specificity to the threshold level of specificity; and for each assigned sub-phrase, executing a corresponding search of the corresponding selected data source by submitting the assigned sub-phrase to the corresponding selected data source in a corresponding API call that causes the corresponding selected data source to provide search results based on the assigned sub-phrase.

17. The non-transitory machine-readable storage medium of claim 16, wherein:

the accessing of the phrase communicated by the user device includes detecting the phrase in a first message sent by the user device to one or more other user devices; and the operations further comprise:

compiling the search results obtained for each assigned sub-phrase in the plurality of sub-phrases; and causing at least a subset of the compiled search results to be presented within a message conversation among the user device and the one or more other user devices.

18. A system comprising:

one or more processors; and a memory storing instructions that, when executed by at least one processor among the one or more processors, cause the system to perform operations comprising:

accessing a phrase communicated by a user device;

deconstructing the phrase into n-grams by parsing the accessed phrase;

generating a plurality of sub-phrases based on the n-grams obtained by the deconstructing of the phrase, each sub-phrase in the plurality of sub-phrases including a different subset of the n-grams;

assigning each sub-phrase in the plurality of sub-phrases to a corresponding data source selected for that sub-phrase from among a plurality of available data sources, the assigning of a first sub-phrase in the plurality of sub-phrases to a corresponding first data source among the plurality of available data sources including:

determining a level of specificity of the first sub-phrase by invoking a natural language processor via a corresponding application programming interface (API) of the natural language processor;

comparing the determined level of specificity of the first sub-phrase to a threshold level of specificity; and selecting the first data source for assignment to the first sub-phrase based on the comparing of the determined level of specificity to the threshold level of specificity; and for each assigned sub-phrase, executing a corresponding search of the corresponding selected data source by submitting the assigned sub-phrase to the corresponding selected data source in a corresponding API call that causes the corresponding selected data source to provide search results based on the assigned sub-phrase.

19. The system of claim 18, wherein:

the accessing of the phrase communicated by the user device includes detecting the phrase in a first message sent by the user device to one or more other user devices; and the operations further comprise:

compiling the search results obtained for each assigned sub-phrase in the plurality of sub-phrases; and causing at least a subset of the compiled search results to be presented within a message conversation among the user device and the one or more other user devices.

* * * * *